(12) United States Patent
Aparin

(10) Patent No.: US 9,129,222 B2
(45) Date of Patent: Sep. 8, 2015

(54) METHOD AND APPARATUS FOR A LOCAL COMPETITIVE LEARNING RULE THAT LEADS TO SPARSE CONNECTIVITY

(75) Inventor: Vladimir Aparin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 525 days.

(21) Appl. No.: 13/166,269

(22) Filed: Jun. 22, 2011

(65) Prior Publication Data

US 2012/0330870 A1    Dec. 27, 2012

(51) Int. Cl.
*G06N 3/10* (2006.01)
*G06N 3/08* (2006.01)
*G06N 3/06* (2006.01)
*G05B 13/02* (2006.01)

(52) U.S. Cl.
CPC ............ *G06N 3/08* (2013.01); *G05B 13/024* (2013.01); *G05B 13/027* (2013.01); *G06N 3/06* (2013.01); *G06N 3/088* (2013.01)

(58) Field of Classification Search
USPC .......................................................... 706/19
See application file for complete search history.

(56) References Cited

U.S. PATENT DOCUMENTS

| | | | |
|---|---|---|---|
| 6,366,897 | B1 | 4/2002 | Means et al. |
| 7,080,053 | B2 | 7/2006 | Adams et al. |
| 2002/0010691 | A1 | 1/2002 | Chen |
| 2004/0034633 | A1* | 2/2004 | Rickard ............................. 707/5 |
| 2008/0294580 | A1 | 11/2008 | Adams et al. |

FOREIGN PATENT DOCUMENTS

JP    2007047945 A    2/2007

OTHER PUBLICATIONS

Lui et al. (Lui97), A New Synthesis Approach for Feedback Neural Networks Based on the Perceptron Training Algorithm. IEEE Transactions on Neural Networks, vol. 8, No. 6 [online], Nov. 1997 [retrieved on Dec. 21, 2013]. Retrieved from the Internet:<URL:http://ieeexplore.ieee.org/stamp/stamp.jsp?arnumber=00641469>.*
Lui et al. (Lui97), A New Synthesis Approach for Feedback Neural Networks Based on the Perceptron Training Algorithm. IEEE Transactions on Neural Networks, vol. 8, No. 6 [online], Nov. 1997 [retrieved on Dec. 21, 2013]. Retrieved from the Internet: <URL:http://ieeexplore.ieee.org/stamp/stamp.jsp?arnumber=00641469>.*

(Continued)

*Primary Examiner* — Jeffrey A Gaffin
*Assistant Examiner* — Nathan Brown, Jr.
(74) *Attorney, Agent, or Firm* — Rupit M. Patel

(57) ABSTRACT

Certain aspects of the present disclosure support a local competitive learning rule applied in a computational network that leads to sparse connectivity among processing units of the network. The present disclosure provides a modification to the Oja learning rule, modifying the constraint on the sum of squared weights in the Oja rule. This constraining can be intrinsic and local as opposed to the commonly used multiplicative and subtractive normalizations, which are explicit and require the knowledge of all input weights of a processing unit to update each one of them individually. The presented rule provides convergence to a weight vector that is sparser (i.e., has more zero elements) than the weight vector learned by the original Oja rule. Such sparse connectivity can lead to a higher selectivity of processing units to specific features, and it may require less memory to store the network configuration and less energy to operate it.

56 Claims, 10 Drawing Sheets

(56) References Cited

OTHER PUBLICATIONS

Wang et al. (Wang05), Comparison of TDNN Training Algorithms in Brain Machine Interfaces, Proceedings of International Joint Conference on Neural Networks, Montreal, Canada [online], Aug. 4, 2005, [retrieved on Dec. 18, 2013]. Retrieved from the Internet: <URL:http://ieeexplore.ieee.org/stamp/stamp.jsp?tp=&arnumber=1556288>.*
Bienenstock, E. L. et al., "Theory for the Development of Neuron Selectivity; Orientation Specificity and Binocular Interaction in Visual Cortex," The Journal of Neuroscience, Jan. 1982, 2(1), pp. 32-48.
Miller, K. D. et al., "The Role of Constraints in Hebbian Learning." Neural Computation, 1994, 6, pp. 100-126.
Oja, E., "Simplified Neuron Model as a Principal Component Analyzer," Journal of Mathematical Biology, 1982, 15(3), pp. 267-273.
O'Reilly, "Six principles for biologically based computational models of cortical cognition", Trends in Cognitive Sciences, vol. 2, No. 11, pp. 455-462, Nov. 1998.
von der Malsburg, C., "Self-Organization of Orientation Sensitive Cells in the Striate Cortex." Kybernetik, 1973, 14, pp. 85-100.
Foldiak P., "Forming Sparse Representations by Local Anti-Hebbian Learning", Biological Cybernetics, Dec. 1990, pp. 165-170, vol. 64, No. 2, Springer Verlag, Heidelberg, DE, XP000202612, ISSN: 0340-1200, DOI: 10.1007/BF02331346.
International Search Report and Written Opinion—PCT/US2012/043594—ISA/EPO—Sep. 14, 2012.
Gouko M., et al., "Associative Memory Model to Acquire Procedural Knowledge under Restriction of Memory Capacity", Transaction of the Institute of Electronics, Information and Communication Engineers (IEICE), Jul. 1, 2005, No. 7, pp. 1304-1307 (Patent Office CSDB No. Domestic Society Article 200501401020).
Ishikawa M., "Brain and Information Processing—How far we can go to create a brain", Computer Today, Saiensu-sha Co., Ltd., Mar. 1, 1999, vol. 16, No. 2, pp. 16-21 (Patent Office CSDB No. Domestic Technical Journal 199900551002).
Sakakibara K., et al., "A Proposal of 3-Dimensional Self-Organizing Memory and Its Application to Knowledge Extraction from Natural Language", Technical Report of the Institute of Electronics, Information and Communication Engineers (IEICE), Mar. 10, 2004, vol. 103, No. 732, pp. 59-64 (Patent Office CSDB No. Domestic Society Article 200500563007).
Seki H., et al., "Detection of Kinematic Constraint from Search Motion of a Robot Using Neural Network", Journal of the Robotics Society of Japan, Mar. 15, 1998, vol. 16, No. 2, pp. 265-273 (Patent Office CSDB No. Domestic Society Article 199900460019).

* cited by examiner

METHOD AND APPARATUS FOR A LOCAL COMPETITIVE LEARNING RULE THAT LEADS TO SPARSE CONNECTIVITY

BACKGROUND

1. Field

Certain aspects of the present disclosure generally relate to neural system engineering and, more particularly, to a method and apparatus for training a computational network using a local training rule that creates sparse connectivity.

2. Background

A developing brain of humans and animals undergoes a synaptic growth spurt in early childhood followed by a massive synaptic pruning, which removes about half of the synapses by adulthood. Synaptic rewiring (structural plasticity) continues in mature brain but at a slower rate. The synaptic pruning is found to be activity dependent and to remove weaker synapses. Because of that, it may be explained by a synaptic plasticity, in which synapses compete for finite resources such as neurotrophic factors. Synaptic pruning helps to increase the brain efficiency, which can be generally defined as the same functionality with fewer synapses. Since transmission of signals through synapses requires energy, a higher efficiency also means a lower energy.

Existing unsupervised learning rules model the synaptic competition for limited resources either explicitly, by the multiplicative or subtractive normalization, or implicitly. However, the explicit normalizations may be nonlocal, i.e., they require the knowledge of all input weights of a neuron to update each one of them individually. However, this may not be biologically plausible. The Oja rule, on the other hand, uses only local information available to a synapse to compute its weight update, but it asymptotically constrains the sum of squared weights, which does not have a biological justification.

SUMMARY

Certain aspects of the present disclosure provide a method of training a computational network. The method generally includes computing an output of a processing unit in the computational network based at least in part on at least one existing weight, and changing the at least one weight of the processing unit using a local training rule, wherein the local training rule creates sparse connectivity between processing units of the computational network.

Certain aspects of the present disclosure provide an apparatus of a computational network. The apparatus generally includes a first circuit configured to compute an output of the apparatus in the computational network based at least in part on at least one existing weight, and a second circuit configured to change the at least one weight of the apparatus using a local training rule, wherein the local training rule creates sparse connectivity between apparatuses of the computational network.

Certain aspects of the present disclosure provide an apparatus of a computational network. The apparatus generally includes means for computing an output of the apparatus in the computational network based at least in part on at least one existing weight, and means for changing the at least one weight of the processing unit using a local training rule, wherein the local training rule creates sparse connectivity between apparatuses of the computational network.

Certain aspects of the present disclosure provide a computer program product for training a computational network. The computer program product generally includes a computer-readable medium comprising code for computing an output of a processing unit in the computational network based at least in part on at least one existing weight, and changing the at least one weight of the processing unit using a local training rule, wherein the local training rule creates sparse connectivity between processing units of the computational network.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System

Figure 1:
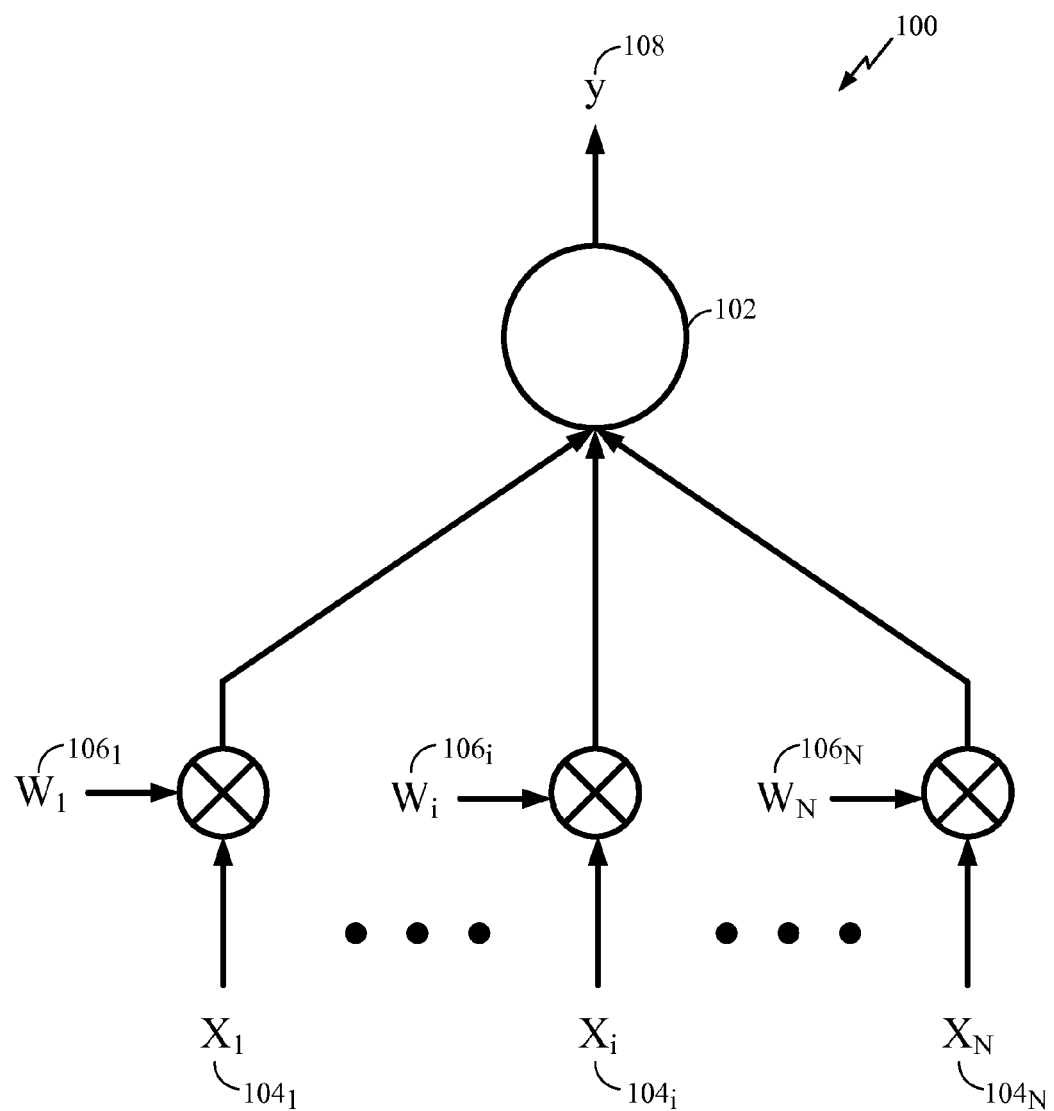
FIG. 1 illustrates an example processing unit of a neural system in accordance with certain aspects of the present disclosure.

FIG. 1 illustrates an example 100 of a processing unit (e.g., a neuron) 102 of a computational network (e.g., a neural system) in accordance with certain aspects of the present disclosure. The neuron 102 may receive multiple input signals $104_1$-$104_N$ ($x_1$-$x_N$), which may be signals external to the neural system, or signals generated by other neurons of the same neural system, or both. The input signal may be a current or a voltage, real-valued or complex-valued. The input signal may comprise a numerical value with a fixed-point or a floating-point representation. These input signals may be delivered to the neuron 102 through synaptic connections that scale the signals according to adjustable synaptic weights $106_1$-$106_N$ ($w_1$-$w_N$), where N may be a total number of input connections of the neuron 102.

The neuron 102 may combine the scaled input signals and use the combined scaled inputs to generate an output signal 108 (i.e., a signal y). The output signal 108 may be a current, or a voltage, real-valued or complex-valued. The output signal may comprise a numerical value with a fixed-point or a floating-point representation. The output signal 108 may be then transferred as an input signal to other neurons of the same neural system, or as an input signal to the same neuron 102, or as an output of the neural system.

The processing unit (neuron) 102 may be emulated by an electrical circuit, and its input and output connections may be emulated by wires with synaptic circuits. The processing unit 102, its input and output connections may also be emulated by a software code. The processing unit 102 may also be emulated by an electric circuit, whereas its input and output connections may be emulated by a software code. In one aspect of the present disclosure, the processing unit 102 in the computational network may comprise an analog electrical circuit. In another aspect, the processing unit 102 may comprise a digital electrical circuit. In yet another aspect, the processing unit 102 may comprise a mixed-signal electrical circuit with both analog and digital components. The computational network may comprise processing units in any of the aforementioned forms. The computational network (neural system) using such processing units may be utilized in a large range of applications, such as image and pattern recognition, machine learning, motor control, and alike.

Local Competitive Learning Rule with L1 Constraint

Certain aspects of the present disclosure support a local competitive learning rule for updating weights associated with one or more processing units (neurons) of a computational network (a neural system), such as the weights $106_1$-$106_N$ illustrated in FIG. 1). The applied local competitive learning rule may lead to sparse connectivity between the processing units, i.e., some of the weights may be equal to zero, or be below a certain threshold value, once the learning process in finished.

In an aspect, the general Hebb's learning rule of synaptic weights which may be expressed as $$\Delta w_i = \eta x_i y. \tag{1}$$

where $\Delta w_i$ is the change in the ith synaptic weight $w_i$, $\eta$ is a learning rate, $x_i$ is the ith input (presynaptic response), and y is the neuron output (postsynaptic response). The rule defined by equation (1) may cause unbounded weight growth, thus failing to account for the brain's limited resources for synaptic potentiation and the resulting competition between synapses for these resources.

Several modifications to the Hebb's rule may help to overcome its drawbacks. For example, a passive weight decay term may be added to equation (1) to restrict the weight growth:

$$\Delta w_i = \eta x_i y - \gamma w_i, 0 < \gamma < 1. \tag{2}$$

This rule may prune connections with low activity, and it may prune all connections if γ is not chosen carefully. Further, the so-called "instar rule", in which the decay term may be gated with the postsynaptic activity y, may circumvent this problem as given by:

$$\Delta w_i = \eta (x_i - w_i) y. \tag{3}$$

A similar rule as the one defined by equation (3) may utilized in the self-organizing maps. It should be noted that this rule may converge to $w_i = x_i$.

A covariance rule can be proposed, which may remove the bias of the Hebb's rule due to nonzero means of x, and y and, at the same time, may add the synaptic depression as given by:

$$\Delta w_i = \eta (x_i - \langle x_i \rangle)(y - \langle y \rangle), \tag{4}$$

where $\langle x_i \rangle$ and $\langle y \rangle$ are the average pre- and postsynaptic activities, respectively. Just like the Hebb's rule, the rule defined by equation (4) may not limit the weight growth and may not force a synaptic competition.

To achieve a synaptic competition, a postsynaptic threshold that grows faster than linearly with the average postsynaptic activity $\langle y \rangle$ may be used. The resulting learning rule, called the BCM rule (Bienenstock-Cooper-Munro rule), may be written as:

$$\Delta w_i = \mu x_i \left[ y - \langle y \rangle \left( \frac{\langle y \rangle}{y_0} \right)^p \right]. \tag{5}$$

where $y_0$ represents an asymptotic target for $\langle y \rangle$, and p>1 is a constant.

To prevent the unbounded growth of weights, the weights may be divided by their sum to keep them constant as given by:

$$w_i(t) = \frac{\alpha w'_i(t)}{\sum_i w'_i(t)}, \quad (6)$$

where $w'_i(t) = w_i(t-1) + \eta x_i y$, $\alpha$ is a target for $\Sigma_i w_i(t)$, and t is the time index. This type of weight bounding can be called the multiplicative normalization. In its original form, the multiplicative normalization may be applied to unipolar weights. However, it may be expanded to bipolar weights by changing the denominator in equation (6) to the $L_1$-norm $\Sigma_i |w'_i(t)|$. It can also be modified to limit the weight vector length (the $L_2$-norm) by changing the denominator to $\sqrt{\Sigma_i w'_i(t)^2}$. Because the weights in equation (6) may be trained by the Hebb's rule and then scaled by a common factor, both learning rules defined by equations (1) and (6) may converge to the weight vectors pointing in the same direction, but having different lengths.

One may also subtract an equal amount from each weight after they are modified by the learning rule defined by equation (1), with the amount chosen so that the total sum of the weights may remain constant:

$$w_i(t) = w'_i(t) - \frac{1}{N}\left(\sum_i w'_i(t) - \alpha\right), \quad (7)$$

where N is a number of inputs. This type of weight bounding can be called the subtractive normalization. Substituting $w'_i(t) = w_i(t-1) + \eta x_i y$ into equation (7) and taking into account $\Sigma_i w_i(t-1) = \alpha$, then the learning rule defined by (7) may reduce to $$\Delta w_i = \eta \left(x_i - \frac{1}{N}\sum_i x_i\right) y. \quad (8)$$

The subtractive normalization may be typically applied to unipolar weights and, thus, may require a zero bound to prevent weights from changing their sign. With the zero bound, all inputs weights of a neuron trained by equation (7) may asymptotically converge to zero except one weight. To prevent a single nonzero weight, an upper bound on the weight magnitude may also be imposed. The main drawback of both multiplicative and subtractive normalizations may be that they are nonlocal, i.e., they may require the knowledge of all input weights or inputs of a neuron to compute each weight individually.

A local learning rule known as the Oja learning rule may constrain the $L_2$ norm of an input weight vector at the equilibrium point. In a general form, the Oja rule may be written as:

$$\Delta w_i = \eta \left(x_i y - \frac{w_i y^2}{\alpha}\right). \quad (9)$$

where $\alpha$ is a target for $\Sigma_i w_i^2$ at the equilibrium point. While this rule may create a competition between synaptic weights for limited resources, modeling these resources as a sum of the squared weights may not be biologically justified.

The aforementioned learning rules may be typically applied to unipolar weights to obey a principle according to which connections from excitatory neurons may need to have positive weights and connections from inhibitory neurons may need to have negative weights. In an aspect, weights may not be allowed to change their sign by using a zero bound. If a rule can segregate afferents, the zero bound may often lead to weight vectors with many zero elements (sparse vectors). However, if weights are allowed to change their sign, then the aforementioned rules may converge to weight vectors with few zero elements (non-sparse vectors).

According to certain aspects of the present disclosure, a modification to the Oja rule defined by equation (9) is proposed as given by:

$$\Delta w_i = \eta \left(x_i y - \frac{\text{sgn}(w_i) y^2}{\alpha}\right), \quad (10)$$

where $\Delta w_i$ is the change in the ith synaptic weight $w_i$, $\eta$ is a learning rate, $x_i$ is the ith input (presynaptic response), y is the neuron output (postsynaptic response), $\alpha$ is a target for $\Sigma_i |w_i|$, and sgn( ) is the sign function.

In order to prove that the proposed rule given by equation (10) constrains $\Sigma_i |w_i|$ to $\alpha$ at the equilibrium point, it can be assumed that the output y is generated as the weighted sum of the neuron's inputs, i.e.:

$$y = \sum_k w_k, r_k. \quad (11)$$

Substituting equation (11) into equation (10) and taking the time average $\langle \rangle$ of the result with an assumption that the weight changes are slow relative to the time over which the input patterns are presented, may result into:

$$\frac{\langle \Delta w_i \rangle}{\eta} = \left\langle \sum_k w_k x_i x_k - \frac{\text{sgn}(w_i)}{\alpha} \sum_{j,k} w_j x_j w_k x_k \right\rangle \quad (12)$$

$$= \sum_k C_{ik} w_k - \frac{\text{sgn}(w_i)}{\alpha} \sum_{j,k} w_j C_{jk} w_k,$$

or, in the matrix form, $$\frac{\langle \Delta w \rangle}{\eta} = Cw - \frac{\text{sgn}(w)}{\alpha}[w^T Cw], \quad (13)$$

where w is the input weight vector, T in the superscript means transpose, and the matrix C with an element $C_{ik} = \langle x_i x_k \rangle$ is a correlation matrix of the inputs.

At the equilibrium point, the average weight change should be equal to zero, i.e.:

$$0 = Cw - \frac{\text{sgn}(w)}{\alpha}[w^T Cw]. \quad (14)$$

Multiplying both sides of equation (14) by $w^T$ from the left, dividing the resulting equation by the scalar $[w^T Cw]$, and rearranging the terms, may result into:

$$w^T \text{sgn}(w) = \|w\|_1 = \alpha. \quad (15)$$

i.e., the $L_1$-norm of the weight vector w may be equal to a at the equilibrium point.

In a similar manner, it can be proved that the following rule may constrain the $L_0$-norm of the weight vector at the equilibrium point:

$$\Delta w_i = \begin{cases} \eta\left(x_i - \frac{y}{\alpha w_i}\right)y & \text{if } w_i \neq 0, \\ \eta\left(x_i - \frac{y}{\alpha}\beta\right)y & \text{if } w_i = 0, \end{cases} \quad (16)$$

where β is a constant (for example, β=1 or β=0), and a is a target for the count of nonzero elements in w. Because of the division by $w_i$, the rule defined by equation (16) may create large $\Delta w_i$ updates when $w_i$ is close to 0, making it oscillate around 0 and never reaching the target unless the zero bound is used. On the other hand, the learning rule defined by equation (10) may not show such behavior and may converge to a sparse w with or without the zero bound, as will be shown in greater detail below.

As a simple example, a linear neuron with two inputs $x_1$ and $x_2$ and the corresponding weights $w_1$ and $w_2$ can be considered. Then, the neuron output may be given by:

$$y = w_1 x_1 + w_2 x_2. \quad (17)$$

where all quantities may be either positive, negative, or zero. If the inputs are zero mean, then the output y may also be zero mean, and the covariance rule defined by equation (4) may reduce to the Hebb's rule defined by equation (1). The Hebb's rule can be viewed as an optimization step in the direction of the gradient of a cost function E:

$$\Delta w_i = \eta \frac{dE}{dw_i}. \quad (18)$$

Figure 2:
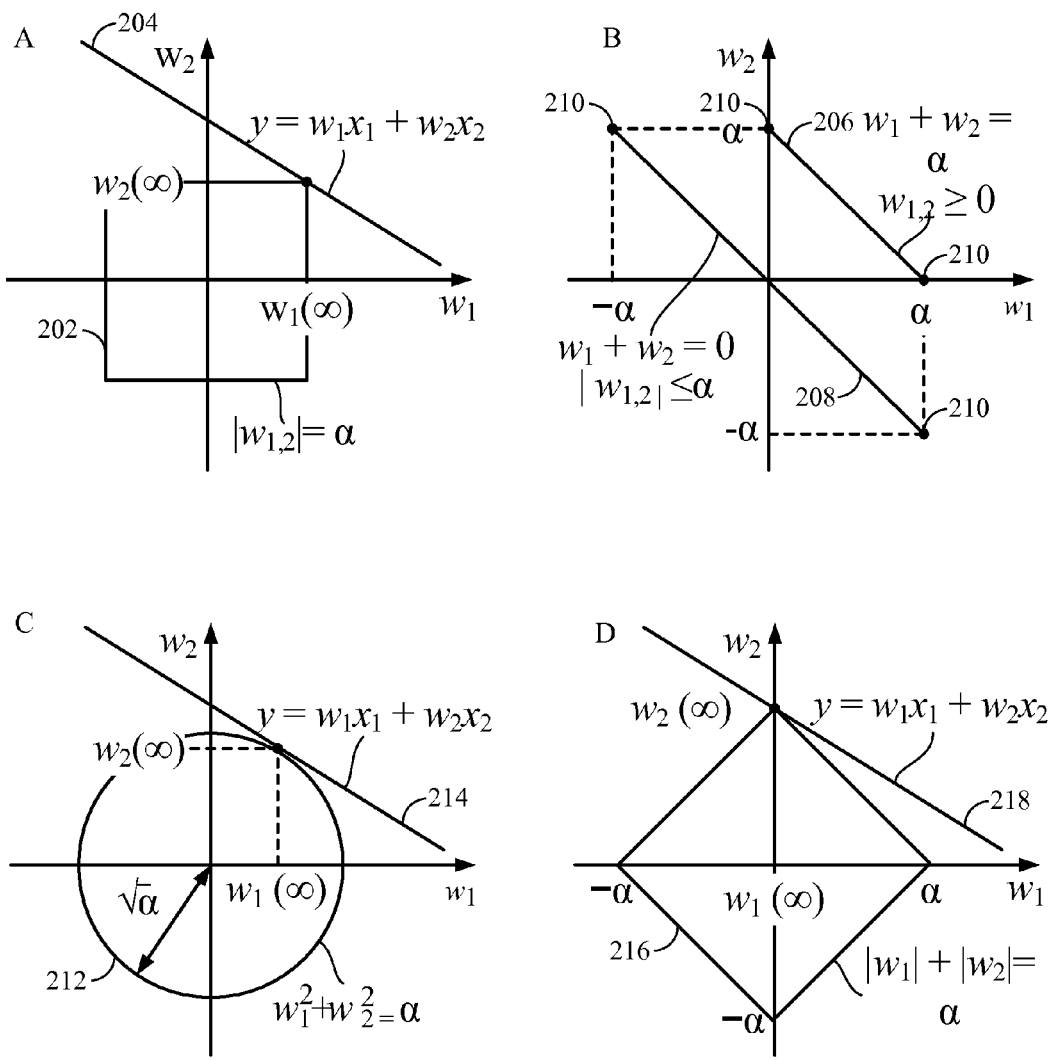
FIGS. 2A-2D illustrate example geometric analysis of asymptotic solutions in accordance with certain aspects of the present disclosure.

It can be shown that $E=y^2/2$, i.e., the Hebb's rule may maximize the neuron energy, thus the unbounded growth of the weight magnitudes. There may be two possible solution paths of the gradient ascent: along the left (y<0) and right (y>0) sides of the parabola $y^2/2$, depending on the initial value of y. For simplicity, this initial value may be assumed being positive, such that the learning rule defined by equation (18) moves along the right side of the parabola $y^2/2$. In this case, maximization of $y^2/2$ may be equivalent to maximization of y. To prevent the unbounded weight growth, a constraint may be imposed on the weight magnitudes: $|w_1|\leq\alpha$ and $|w_2|\leq\alpha$. This constraint may draw a square 202 on the $(w_1;w_2)$ plane, as illustrated in FIG. 2A. A straight line 204 may draw all possible $(w_1; w_2)$ solutions for given y, $x_1$, and $x_2$. The slope of the line 204 may be determined by $-x_1/x_2$, and its position relative to the center may be determined by $y/x_2$. Maximization of y may move the line 204 away from the center (up if $x_2$>0 or down if $x_2$<0). The asymptotic solution $(w_1(\infty);w_2(\infty))$ may be found by moving the line 204 in the direction of increasingly until it touches the square 202 at just one point, which may be always one of the corners unless $x_1$=0 or $x_2$=0. As it can be observed in FIG. 2A, for the vast majority of inputs, the Hebb's rule with the specified bounds may lead to a solution in which all weights have the maximum magnitude, i.e., $|w_1|=|w_2|=\alpha$.

The Hebb's rule with the subtractive normalization defined by equation (7) may maintain the total sum of the weights constant, i.e., $w_1+w_2=\alpha$. This constraint may draw a straight line 206 passing through $(\alpha,0)$ and $(0,\alpha)$ on the $(w_1;w_2)$ plane as illustrated in FIG. 2B. Two constraints are illustrated: the line 206 may be associated with nonnegative weights, and another line 208 may be associated with bipolar weights. Possible asymptotic solutions are marked with 210. The subtractive normalization may be typically applied to nonnegative weights, in which case α>0 and the weights are bounded at zero, i.e., $w_1 \geq 0$ and $w_2 \geq 0$. The asymptotic solutions may be $(\alpha, 0)$ and $(0, \alpha)$, which are both sparse. If weights are allowed to change their sign, then the asymptotic solutions may be unbounded unless bounds may be forced. If the maximum weight magnitude is constrained at α, then the asymptotic solutions may be $(-\alpha, \alpha)$ and $(\alpha, -\alpha)$, which are both non-sparse.

To the first-order approximation, the Oja rule defined by equation (9) may be broken into the Hebbian term (the first term in the parentheses of equation (9)) and the constraint term (the second term in the parentheses of equation (9)). The Hebbian term may maximize the output y assuming that the initial output y is positive, and the second term may impose the constraint $w_1^2 + w_2^2 = \alpha$ on the asymptotic solution. This constraint may draw a circle 212 with the radius $\sqrt{\alpha}$ on the $(w_1;w_2)$ plane, as illustrated in FIG. 2C. The asymptotic solution $(w_1(\infty);w_2(\infty))$ may be found as a point, at which a solution line 214 defined by equation (17) is tangent to the circle 212. As it can be observed in FIG. 2C, it may be impossible to obtain a sparse solution with the Oja rule unless $x_1$=0 or $x_2$=0. A more rigorous analysis can show that the Oja rule may converge to the principal eigenvector of the data covariance matrix C with $C_{ik}=\langle x_i x_k\rangle$.

Certain aspects of the present disclosure support the local learning rule defined by equation (10), which may impose the asymptotic constraint $|w_1|+|w_2|=\alpha$. This constraint may draws a rhombus 216 with all sides equal to $\sqrt{2\alpha}$ on the $(w_1;w_2)$ plane, as illustrated in FIG. 2D. The asymptotic solution $(w_1(\infty);w_2(\infty))$ may be found by moving a solution line 218 defined by equation (17) in the direction of increasing output y until it touches the rhombus 216 at just one point, which may always be one of the vertices unless $|x_1|=|x_2|$. Therefore, for the vast majority of inputs, the proposed rule may provide a sparse solution (i.e., one of the two weights may be zero).

In a general case of N input weights, the rule defined by equation (10) theoretically may converge to a solution with only one nonzero weight of magnitude α. It may be desirable to allow the weight vector to have more than one nonzero element. To achieve that, an upper limit on each weight magnitude, $w_{max}$, may be imposed such that $w_{max}<\alpha$, where $\alpha/w_{max}$ may be a target for the count of nonzero elements in w. In an aspect, the choice of α may be arbitrary. However, if all inputs and outputs in the network are desired to be within the same bounds (e.g., $x_i \in [-1; 1]$ and $y \in [-1; 1]$), then the appropriate value for α may be one. In this case, the only input parameters required for the learning rule may be the learning rate q and the weight magnitude limit $w_{max} \leq 1$.

The $L_0$-constraint rule defined by equation (16) may also be forced to keep the network inputs and outputs within the same bounds by limiting the maximum weight magnitude to $w_{max}=1/\alpha$, where α is a number of nonzero elements in each weight vector.

Figure 3:
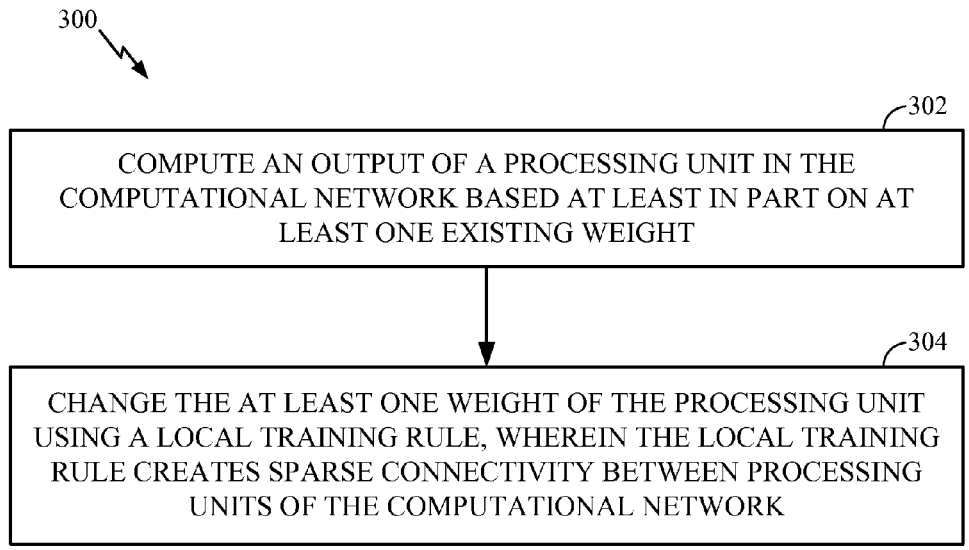
FIG. 3 illustrates operations for updating synapse weights of the neural system using a local training rule in accordance with certain aspects of the present disclosure.

FIG. 3 illustrates example operations 300 for training a computational network (neural network) in accordance with aspects of the present disclosure. At 302 an output of a processing unit (neuron) in the computational network may be computed based at least in part on at least one existing weight. At 304, the at least one weight of the processing unit may be changed using a local training rule, wherein the local training rule may create sparse connectivity between processing units of the computational network.

In accordance with certain aspects of the present disclosure, changing the at least one weight using the local training rule may comprise updating the at least one weight based on at least one of: one or more inputs in the processing unit, the output, or the at least on existing weight before the change. According to certain embodiments, sparse connectivity may be created after multiple updating of the at least one weight.

To demonstrate certain embodiments of the present disclosure, the learning rule defined by equation (10) and its difference from other rules, may be used to train the feed-forward connection weights in a primary visual cortex (V1) neural network model. The network may consists of four two-dimensional layers: photoreceptors, retinal ganglion cells (RGCs), V1 simple cells (S1s), and V1 complex cells (C1s). The photoreceptors may be mapped 1:1 to the pixels of an input image. Each photoreceptor may code the luminosity of the corresponding pixel in the range $[-1, 1]$. The photoreceptor outputs may be fed to the retinotopically mapped RGCs through fixed-weight connections performing a spatial filtering of the input image with a Difference of Gaussians (DoG).

The output of each RGC may be calculated as a linear sum of the weighted inputs. It may be either positive, negative, or zero. Such RGC may combine ON and OFF cells with the same inputs and opposite-polarity input weights. Its output may be equal to the difference of the corresponding ON- and OFF-cell outputs. The RGC outputs may be fed to the simple cells through adaptive bipolar weights, which may model the difference between the weights from the corresponding ON and OFF cells. These RGC-to-S1 weights may determine the receptive fields of the simple cells. The S1 layer may also have lateral connections with a short-range excitation and a long-range inhibition. These lateral connections may help the simple cells to self-organize into the orientation map with pinwheels and linear zones. Each simple cell S1 may be modeled as a sum of weighted inputs passed through a half-wave rectifier, which may preserve the positive part of the output and clip the negative part to zero. The positive outputs of S1s may be fed to the C1s through adaptive positive weights.

First, the RGC-to-S1 connections were trained using four rules: the Hebb's rule with the subtractive normalization defined by equation (7), the Oja rule defined by equation (9), the proposed local learning rule defined by equation (10), and the modified local learning rule defined by (16). All four rules may result into weight bounding, wherein weights being learned may be bounded to the range of $[-w_{max}, w_{max}]$.

Figure 4:
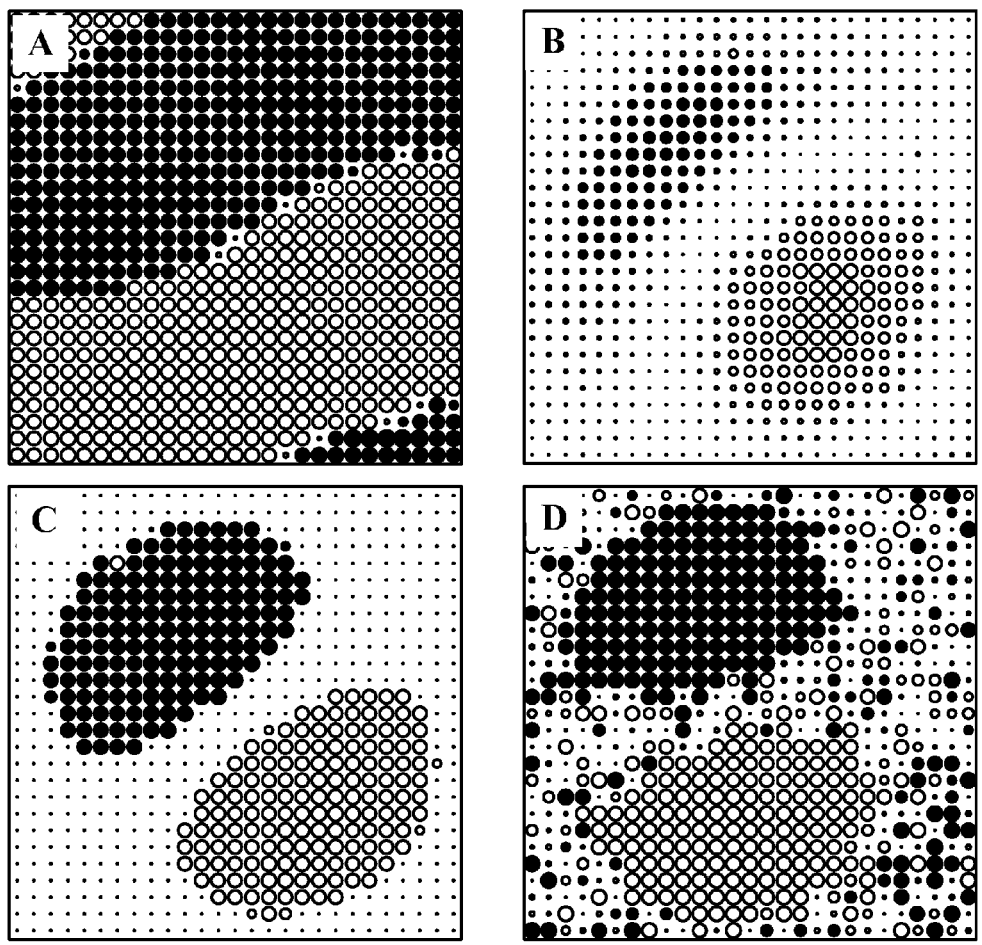
FIGS. 4A-4D illustrate afferent receptive fields of a simple cell trained by four different rules in accordance with certain aspects of the present disclosure.

FIGS. 4A-4D illustrate examples of the emerged RGC-to-S1 weight matrices, in which the filled circles represent positive weights (the ON region), and the hollow circles represent negative weights (the OFF region). The circle diameter may be proportional to the weight magnitude. The weights may be trained by four aforementioned rules with a $[w_{max}, w_{max}]$ bounding. FIG. 4A illustrates weights trained by the Hebb's rule with subtractive normalization. FIG. 4B illustrates weights trained by the Oja rule. FIG. 4C illustrates weights trained by the rule defined by equation (10) with $L_1$ constraint. FIG. 4D illustrates weights trained by the rule with $L_0$ constraint defined by equation (16).

Figure 5:
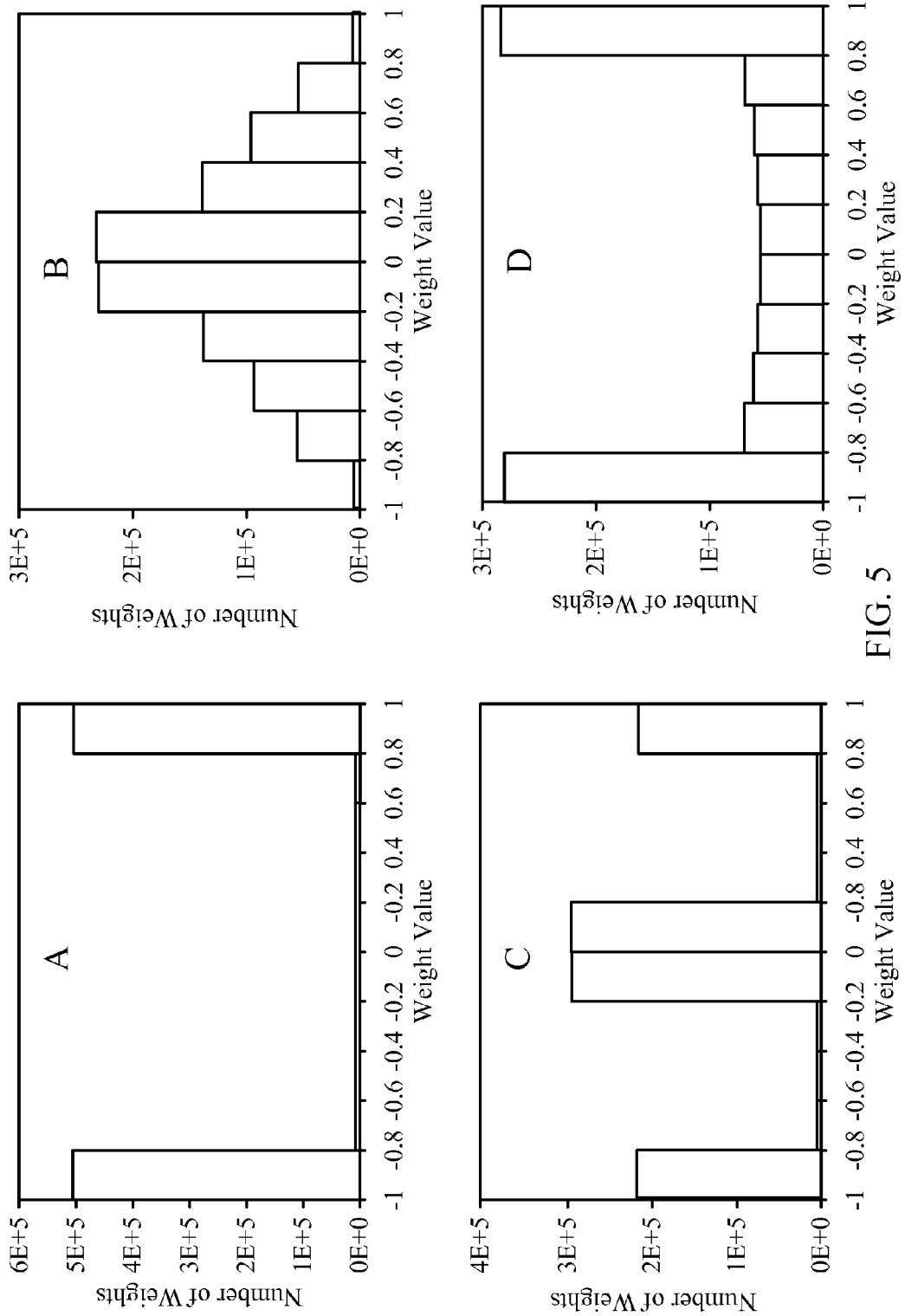
FIGS. 5A-5D illustrate distributions of Retinal Ganglion Cell to simple-cell (RGC-to-S1) weights in accordance with certain aspects of the present disclosure.

FIGS. 5A-5D illustrate the corresponding distributions of all RGC-to-S1 weights. As illustrated in FIG. 5A, the Hebb's rule with the subtractive normalization may converge to the weights of maximum magnitude. The Oja rule, illustrated in FIG. 5B, may converge to graded weights, some of which may have small but nonzero values. The proposed rule defined by equation (10), illustrated in FIG. 5C, may converge to a weight matrix with well-defined ON and OFF regions and many close-to-zero elements. The rule defined by equation (16), illustrated in FIG. 5D, may fail to converge to a sparse weight matrix because of the division by $w_i$, which may make small weights to oscillate around zero. It may be impossible to obtain exactly-zero weights without the zero bound in any of the rules. Therefore, to estimate the sparsity of weight matrices, the weights that are zero within a chosen rounding error may be counted. With the rounding error of $0:01\, w_{max}$, approximately 54% of RGC-to-S1 weights trained by the proposed rule defined by equation (10) may be zero, whereas less than 3% of weights trained by the other three rules may be zero.

Figure 6:
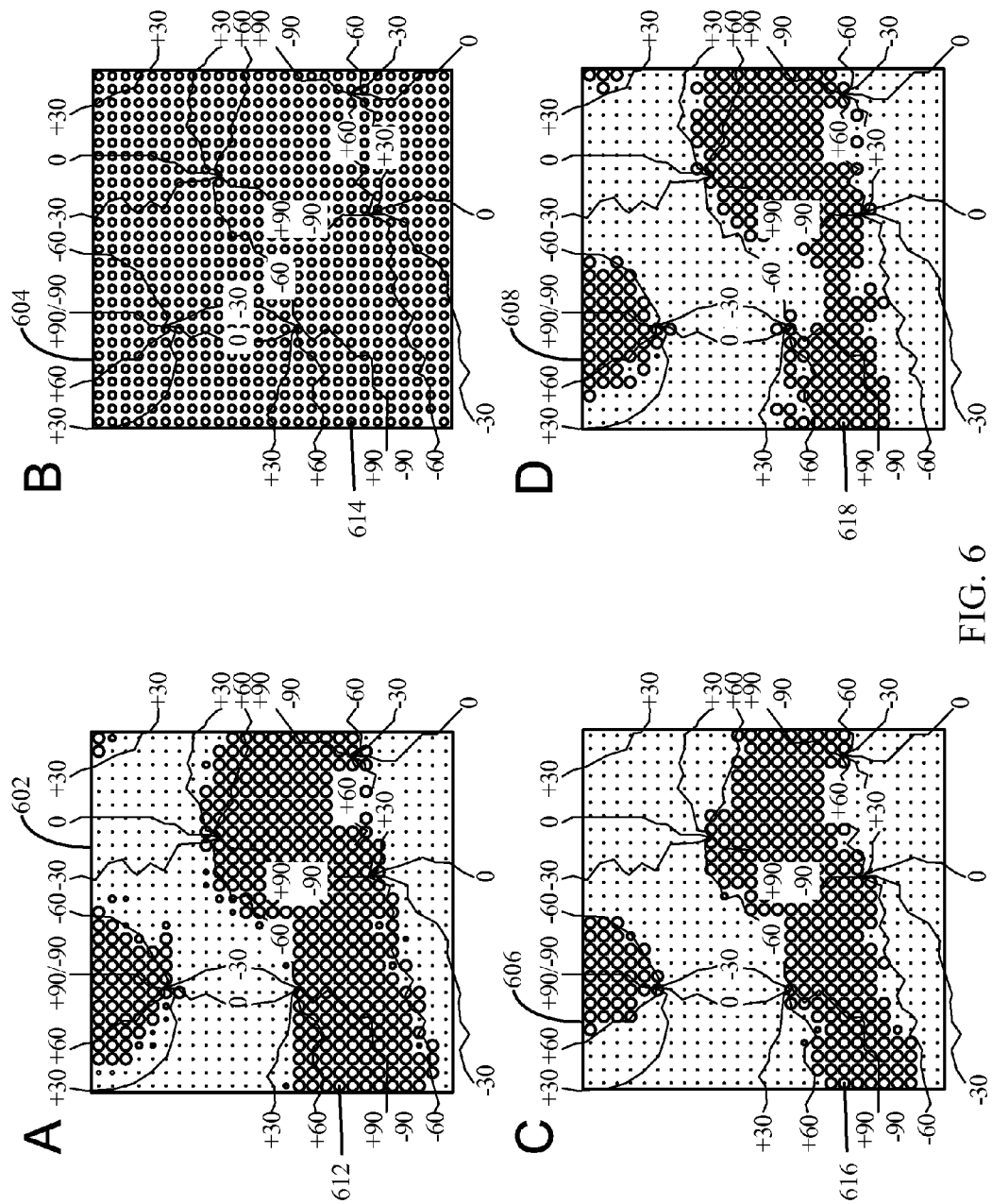
FIGS. 6A-6D illustrate a simple-cell orientation map with connections from a pool of simple cells to the same complex cell in accordance with certain aspects of the present disclosure.

FIGS. 6A-6D illustrate the same four rules used to train the S1-to-C1 connections. This time, each rule may have an added weight bounding to $[0, w_{max}]$. A fragment of the S1 layer is illustrated in FIGS. 6A-6D, which shows a two-dimensional arrangement of simple cells as an iso-orientation contour plot of their preferred orientations (values over the contours represent preferred orientations of the simple cells located under these contours). Boxes 602, 604, 606, 608 may outline the pool of S1 cells, whose outputs may be fed to the same complex cell. The hollow circles 612, 614, 616, 618 inside the boxes may indicate the connection strengths from these simple cells to the chosen complex cell: the larger the circle, the larger the weight. FIG. 6A illustrates weights trained by the Hebb's rule with subtractive normalization. FIG. 6B illustrates weights trained by the Oja rule. FIG. 6C illustrates weights trained by the rule defined by equation (10) with $L_1$ constraint. FIG. 6D illustrates weights trained by the rule defined by equation (16) with $L_0$ constraint.

Figure 7:
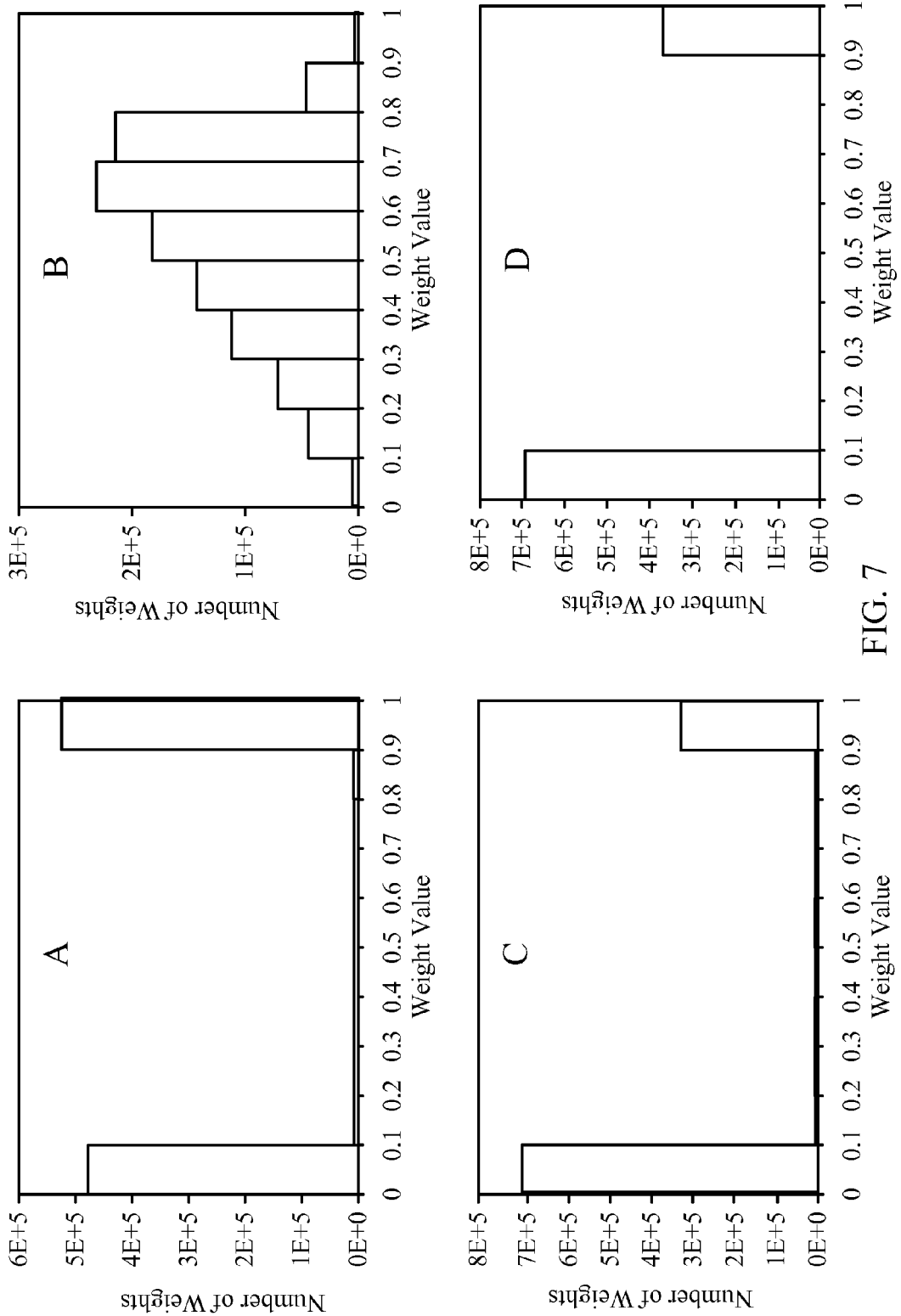
FIGS. 7A-7D illustrate a distribution of simple-cell to complex-cell (S1-to-C1) weights trained by four different rules in accordance with certain aspects of the present disclosure.

FIGS. 7A-7D illustrate the corresponding distributions of all S1-to-C1 weights. It can be observed in FIG. 7A that the Hebb's rule with the subtractive normalization may creates a sparse S1-to-C1 connectivity due to to the zero lower bound. FIG. 7B illustrates that the Oja rule creates connections of variable strength to all simple cells within the box, even to those with orthogonal orientations. According to certain aspects of the present disclosure, as illustrated in FIG. 7C, the proposed local learning rule defined by equation (10) may create strong connections to the simple cells of similar orientations and the zero-strength connections to the simple cells of other orientations, which may be consistent with biological data of orientation-selective and shift-invariant complex cells. The learning rule defined by equation (16), as illustrated in FIG. 7D, may also create a sparse S1-to-C1 connectivity due to clipping of the negative weights to zero.

Figure 8:
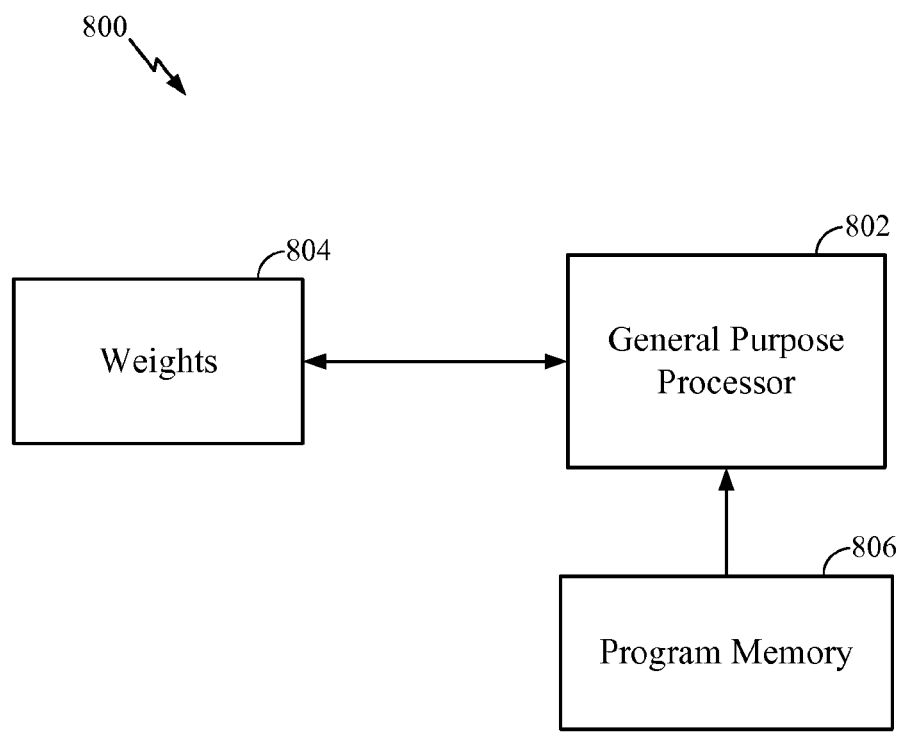
FIG. 8 illustrates an example software implementation of a local training rule using a general-purpose processor in accordance with certain aspects of the present disclosure.

FIG. 8 illustrates an example software implementation 800 of the aforementioned local training rule using a general-purpose processor 802 in accordance with certain aspects of the present disclosure. Existing weights associated with each processing unit (neuron) of a computational network (neural network) may be stored in a memory block 804, while instructions related to the local training rule being executed at the general-purpose processor 802 may be loaded from a program memory 806. According to certain aspects of the present disclosure, the loaded instructions may comprise code for computing an output of each processing unit in the computational network based at least in part on at least one existing weight stored in the memory block 804. Further, the loaded instructions may comprise code for changing the at least one weight of that processing unit according to the local training rule, wherein the local training rule may create sparse connectivity between processing units of the computational network. In an aspect of the present disclosure, the code for changing the at least one weight of that processing unit may comprise code for updating the at least one weight based on at least one of: one or more inputs in that processing unit, the previously computed output, or the at least one existing weight before the change. The updated weights may be stored in the memory block 804 replacing old weights.

Figure 9:
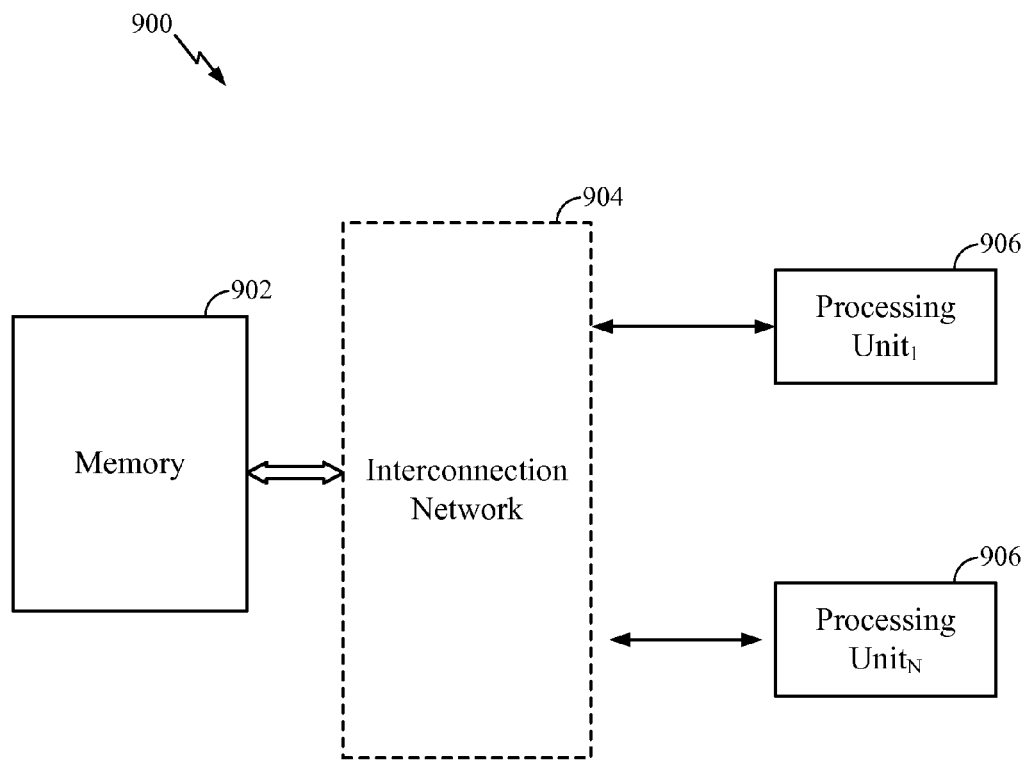
FIG. 9 illustrates an example implementation of a local training rule where a weight memory is interfaced with individual distributed processing units in accordance with certain aspects of the present disclosure.

FIG. 9 illustrates an example implementation 900 of the aforementioned local training rule where a weight memory 902 is interfaced via an interconnection network 904 with individual (distributed) processing units (neurons) 906 of a computational network (neural network) in accordance with certain aspects of the present disclosure. At least one existing weight associated with a processing unit 906 may be loaded from the memory 902 via connection(s) of the interconnection network 904 into that processing unit 906. The processing unit 906 may be configured to compute its output based at least in part on the at least one existing weight. Further, the processing unit 906 may be configured to change the at least one weight associated with that processing unit according to the local training rule, wherein the local training rule may create sparse connectivity between the processing units 906 of the computational network. In an aspect of the present disclosure, changing the at least one weight according to the local learning rule may further comprise updating the at least one weight based on at least one of: one or more inputs in the processing unit 906, the previously computed output of the processing unit 906, or the at least one existing weight before the change. The updated weights may be stored in the memory 904 replacing old weights associated with that processing unit 906.

Figure 10:
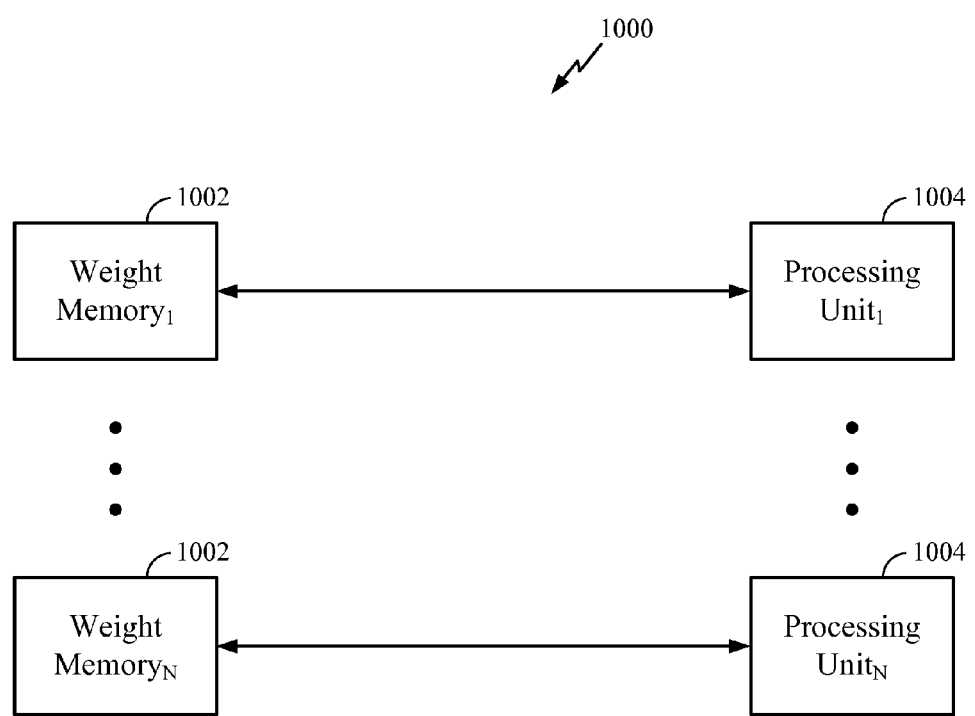
FIG. 10 illustrates an example implementation of a local training rule based on distributed weight memories and distributed processing units in accordance with certain aspects of the present disclosure.

FIG. 10 illustrates an example implementation 1000 of the aforementioned local training rule based on distributed weight memories 1002 and distributed processing units 1004 in accordance with certain aspects of the present disclosure. As illustrated in FIG. 10, one weight memory bank 1002 may be directly interfaced with one processing unit (neuron) 1004 of a computational network (neural network), wherein that memory bank 1002 may store at least one existing weight associated with that processing unit 1004. The processing unit 1004 may be configured to compute its output based at least in part on the at least one existing weight loaded from the corresponding weight memory bank 1002. Further, the processing unit 1004 may be configured to change the at least one weight associated with that processing unit according to the local training rule, wherein the local training rule may create sparse connectivity between the processing units 1004 of the computational network. In an aspect of the present disclosure, changing the at least one weight by the processing unit 1004 according to the local learning rule may further comprise updating the at least one weight based on at least one of: one or more inputs in the processing unit 1004, the previously computed output of the processing unit 1004, or the at least one existing weight before the change. The updated weights may be stored in the corresponding memory bank 1002 replacing old weights.

According to aspects of the present disclosure, the proposed learning rule may constrain the L1-norm of the input weight vector of a neuron at the equilibrium point. The learning rule may be local and intrinsic, which may make software and hardware implementations simpler. This rule may converge to a sparser weight vector than that learned by the original Oja rule with or without the zero bound. Such sparse connectivity may lead to higher selectivity of neurons to specific features, which may be found in many biological studies. Another advantage of constraining the L1-norm instead of the L2-norm may be the simplicity of keeping the inputs and outputs in the network within the same bounds by choosing $\alpha=1$.

Figure 3A:
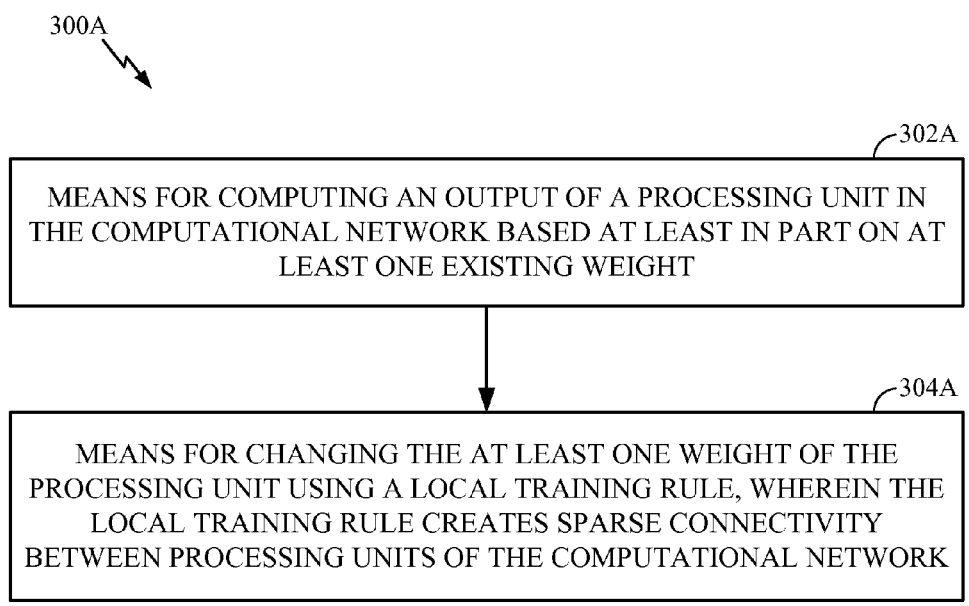
FIG. 3A illustrates example components capable of performing the operations illustrated in FIG. 3.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 300 illustrated in FIG. 3 correspond to components 300A illustrated in FIG. 3A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A method of training a computational network, comprising:
    computing an output of a processing unit in the computational network based at least in part on at least one existing weight; and
    changing the at least one weight of the processing unit using a local training rule, wherein the local training rule creates sparse connectivity between processing units of the computational network by constraining a norm of a weight vector comprising weights associated with connections between the processing units to a defined value when an average change of the weights equals zero,
    wherein the computational network comprises a neural network, and the processing unit comprises a neuron circuit.

2. The method of claim 1, wherein changing the at least one weight using the local training rule comprises
    updating the at least one weight based on at least one of: one or more inputs in the processing unit, the output, or the at least one existing weight before the change.

3. A method of training a computational network, comprising:
    computing an output of a processing unit in the computational network based at least in part on at least one existing weight; and
    changing the at least one weight of the processing unit using a local training rule, wherein the local training rule creates sparse connectivity between processing units of the computational network by constraining a norm of a weight vector comprising weights associated with connections between the processing units to a defined value when an average change of the weights equals zero, wherein changing the at least one weight using the local training rule comprises updating the at least one weight based on at least one of: one or more inputs in the processing unit, the output, or the at least one existing weight before the change, and wherein the sparse connectivity is created after multiple updating of the at least one weight.

4. A method of training a computational network, comprising:
    computing an output of a processing unit in the computational network based at least in part on at least one existing weight; and
    changing the at least one weight of the processing unit using a local training rule, wherein the local training rule creates sparse connectivity between processing units of the computational network by constraining a norm of a weight vector comprising weights associated with connections between the processing units to a defined value when an average change of the weights equals zero,
    wherein the local training rule imposes a constraint on a sum of absolute values of the weights.

5. The method of claim 4, wherein the constrained weights are associated with input connections to the processing unit.

6. A method of training a computational network, comprising:
computing an output of a processing unit in the computational network based at least in part on at least one existing weight; and
changing the at least one weight of the processing unit using a local training rule, wherein the local training rule creates sparse connectivity between processing units of the computational network by constraining a norm of a weight vector comprising weights associated with connections between the processing units to a defined value when an average change of the weights equals zero,
wherein the local training rule constrains an input weight vector associated with input connections to the processing unit at an equilibrium point.

7. A method of training a computational network, comprising:
computing an output of a processing unit in the computational network based at least in part on at least one existing weight; and
changing the at least one weight of the processing unit using a local training rule, wherein the local training rule creates sparse connectivity between processing units of the computational network by constraining a norm of a weight vector comprising weights associated with connections between the processing units to a defined value when an average change of the weights equals zero,
wherein the local training rule constrains a number of nonzero weights.

8. The method of claim 7, wherein the constrained weights are associated with input connections to the processing unit.

9. A method of training a computational network, comprising:
computing an output of a processing unit in the computational network based at least in part on at least one existing weight; and
changing the at least one weight of the processing unit using a local training rule, wherein the local training rule creates sparse connectivity between processing units of the computational network by constraining a norm of a weight vector comprising weights associated with connections between the processing units to a defined value when an average change of the weights equals zero,
wherein the processing unit utilizes one or more non-linear operations.

10. A method of training a computational network, comprising:
computing an output of a processing unit in the computational network based at least in part on at least one existing weight; and
changing the at least one weight of the processing unit using a local training rule, wherein the local training rule creates sparse connectivity between processing units of the computational network by constraining a norm of a weight vector comprising weights associated with connections between the processing units to a defined value when an average change of the weights equals zero,
wherein the local training rule imposes bounds on individual weights associated with input connections to the processing unit.

11. The method of claim 10, wherein a maximum value of the individual weights is bounded by an upper bound.

12. The method of claim 10, wherein a minimum value of the individual weights is bounded by a lower bound.

13. The method of claim 10, wherein both maximum and minimum values of the individual weights are bounded.

14. The method of claim 10, wherein the bounds vary for the individual weights.

15. An apparatus of a computational network, comprising:
at least one processing unit configured to:
compute an output of the apparatus in the computational network based at least in part on at least one existing weight; and
change the at least one weight of the apparatus using a local training rule, wherein the local training rule creates sparse connectivity between apparatuses of the computational network by constraining a norm of a weight vector comprising weights associated with connections between the apparatuses to a defined value when an average change of the weights equals zero,
wherein the computational network comprises a neural network, and the apparatus comprises a neuron circuit.

16. The apparatus of claim 15, wherein the at least one processing unit is also configured to update the at least one weight based on at least one of: one or more inputs in the apparatus, the output, or the at least one existing weight before the change.

17. An apparatus of a computational network, comprising:
at least one processing unit configured to:
compute an output of the apparatus in the computational network based at least in part on at least one existing weight; and
change the at least one weight of the apparatus using a local training rule, wherein the local training rule creates sparse connectivity between apparatuses of the computational network by constraining a norm of a weight vector comprising weights associated with connections between the apparatuses to a defined value when an average change of the weights equals zero, wherein the at least one processing unit is also configured to update the at least one weight based on at least one of: one or more inputs in the apparatus, the output, or the at least one existing weight before the change, and wherein the sparse connectivity is created after multiple updating of the at least one weight.

18. An apparatus of a computational network, comprising:
at least one processing unit configured to:
compute an output of the apparatus in the computational network based at least in part on at least one existing weight; and
change the at least one weight of the apparatus using a local training rule, wherein the local training rule creates sparse connectivity between apparatuses of the computational network by constraining a norm of a weight vector comprising weights associated with connections between the apparatuses to a defined value when an average change of the weights equals zero,
wherein the local training rule imposes a constraint on a sum of absolute values of the weights.

19. The apparatus of claim 18, wherein the constrained weights are associated with input connections to the apparatus.

20. An apparatus of a computational network, comprising:
at least one processing unit configured to:
compute an output of the apparatus in the computational network based at least in part on at least one existing weight; and
change the at least one weight of the apparatus using a local training rule, wherein the local training rule creates sparse connectivity between apparatuses of the computational network by constraining a norm of a weight vector comprising weights associated with connections between the apparatuses to a defined value when an average change of the weights equals zero, wherein the local training rule constrains an input weight vector associated with input connections to the apparatus at an equilibrium point.

21. An apparatus of a computational network, comprising:
at least one processing unit configured to:
compute an output of the apparatus in the computational network based at least in part on at least one existing weight; and
a change the at least one weight of the apparatus using a local training rule, wherein the local training rule creates sparse connectivity between apparatuses of the computational network by constraining a norm of a weight vector comprising weights associated with connections between the apparatuses to a defined value when an average change of the weights equals zero,
wherein the local training rule constrains a number of nonzero weights.

22. The apparatus of claim 21, wherein the constrained weights are associated with input connections to the apparatus.

23. An apparatus of a computational network, comprising:
at least one processing unit configured to:
compute an output of the apparatus in the computational network based at least in part on at least one existing weight; and
change the at least one weight of the apparatus using a local training rule, wherein the local training rule creates sparse connectivity between apparatuses of the computational network by constraining a norm of a weight vector comprising weights associated with connections between the apparatuses to a defined value when an average change of the weights equals zero,
wherein the apparatus utilizes one or more non-linear operations.

24. An apparatus of a computational network, comprising:
at least one processing unit configured to:
compute an output of the apparatus in the computational network based at least in part on at least one existing weight; and
change the at least one weight of the apparatus using a local training rule, wherein the local training rule creates sparse connectivity between apparatuses of the computational network by constraining a norm of a weight vector comprising weights associated with connections between the apparatuses to a defined value when an average change of the weights equals zero,
wherein the local training rule imposes bounds on individual weights associated with input connections to the apparatus.

25. The apparatus of claim 24, wherein a maximum value of the individual weights is bounded by an upper bound.

26. The apparatus of claim 24, wherein a minimum value of the individual weights is bounded by a lower bound.

27. The apparatus of claim 24, wherein both maximum and minimum values of the individual weights are bounded.

28. The apparatus of claim 24, wherein the bounds vary for the individual weights.

29. An apparatus of a computational network, comprising:
means for computing an output of the apparatus in the computational network based at least in part on at least one existing weight; and
means for changing the at least one weight of the apparatus using a local training rule, wherein the local training rule creates sparse connectivity between apparatuses of the computational network by constraining a norm of a weight vector comprising weights associated with connections between the apparatuses to a defined value when an average change of the weights equals zero,
wherein the computational network comprises a neural network, and the apparatus comprises a neuron circuit.

30. The apparatus of claim 29, wherein the means for changing the at least one weight using the local training rule comprises
means for updating the at least one weight based on at least one of: one or more inputs in the apparatus, the output, or the at least one existing weight before the change.

31. An apparatus of a computational network, comprising:
means for computing an output of the apparatus in the computational network based at least in part on at least one existing weight; and
means for changing the at least one weight of the apparatus using a local training rule, wherein the local training rule creates sparse connectivity between apparatuses of the computational network by constraining a norm of a weight vector comprising weights associated with connections between the apparatuses to a defined value when an average change of the weights equals zero,
wherein the means for changing the at least one weight using the local training rule comprises means for updating the at least one weight based on at least one of: one or more inputs in the apparatus, the output, or the at least one existing weight before the change, and wherein the sparse connectivity is created after multiple updating of the at least one weight.

32. An apparatus of a computational network, comprising:
means for computing an output of the apparatus in the computational network based at least in part on at least one existing weight; and
means for changing the at least one weight of the apparatus using a local training rule, wherein the local training rule creates sparse connectivity between apparatuses of the computational network by constraining a norm of a weight vector comprising weights associated with connections between the apparatuses to a defined value when an average change of the weights equals zero,
wherein the local training rule imposes a constraint on a sum of absolute values of the weights.

33. The apparatus of claim 32, wherein the constrained weights are associated with input connections to the apparatus.

34. An apparatus of a computational network, comprising:
means for computing an output of the apparatus in the computational network based at least in part on at least one existing weight; and
means for changing the at least one weight of the apparatus using a local training rule, wherein the local training rule creates sparse connectivity between apparatuses of the computational network by constraining a norm of a weight vector comprising weights associated with connections between the apparatuses to a defined value when an average change of the weights equals zero,
wherein the local training rule constrains an input weight vector associated with input connections to the apparatus at an equilibrium point.

35. An apparatus of a computational network, comprising:
means for computing an output of the apparatus in the computational network based at least in part on at least one existing weight; and
means for changing the at least one weight of the apparatus using a local training rule, wherein the local training rule creates sparse connectivity between apparatuses of the computational network by constraining a norm of a weight vector comprising weights associated with connections between the apparatuses to a defined value when an average change of the weights equals zero, wherein the local training rule constrains a number of nonzero weights.

36. The apparatus of claim 35, wherein the constrained weights are associated with input connections to the apparatus.

37. An apparatus of a computational network, comprising:
means for computing an output of the apparatus in the computational network based at least in part on at least one existing weight; and
means for changing the at least one weight of the apparatus using a local training rule, wherein the local training rule creates sparse connectivity between apparatuses of the computational network by constraining a norm of a weight vector comprising weights associated with connections between the apparatuses to a defined value when an average change of the weights equals zero,
wherein the apparatus utilizes one or more non-linear operations.

38. An apparatus of a computational network, comprising:
means for computing an output of the apparatus in the computational network based at least in part on at least one existing weight; and
means for changing the at least one weight of the apparatus using a local training rule, wherein the local training rule creates sparse connectivity between apparatuses of the computational network by constraining a norm of a weight vector comprising weights associated with connections between the apparatuses to a defined value when an average change of the weights equals zero,
wherein the local training rule imposes bounds on individual weights associated with input connections to the apparatus.

39. The apparatus of claim 38, wherein a maximum value of the individual weights is bounded by an upper bound.

40. The apparatus of claim 38, wherein a minimum value of the individual weights is bounded by a lower bound.

41. The apparatus of claim 38, wherein both maximum and minimum values of the individual weights are bounded.

42. The apparatus of claim 38, wherein the bounds vary for the individual weights.

43. A computer program product for training a computational network, comprising a non-transitory computer-readable medium comprising code for:
computing an output of a processing unit in the computational network based at least in part on at least one existing weight; and
changing the at least one weight of the processing unit using a local training rule, wherein the local training rule creates sparse connectivity between processing units of the computational network by constraining a norm of a weight vector comprising weights associated with connections between the processing units to a defined value when an average change of the weights equals zero,
wherein the computational network comprises a neural network, and the processing unit comprises a neuron circuit.

44. The computer program product of claim 43, wherein the computer-readable medium further comprising code for updating the at least one weight based on at least one of: one or more inputs in the processing unit, the output, or the at least one existing weight before the change.

45. A computer program product for training a computational network, comprising a non-transitory computer-readable medium comprising code for:
computing an output of a processing unit in the computational network based at least in part on at least one existing weight; and
changing the at least one weight of the processing unit using a local training rule, wherein the local training rule creates sparse connectivity between processing units of the computational network by constraining a norm of a weight vector comprising weights associated with connections between the processing units to a defined value when an average change of the weights equals zero,
wherein the computer-readable medium further comprising code for updating the at least one weight based on at least one of: one or more inputs in the processing unit, the output, or the at least one existing weight before the change, and wherein the sparse connectivity is created after multiple updating of the at least one weight.

46. A computer program product for training a computational network, comprising a non-transitory computer-readable medium comprising code for:
computing an output of a processing unit in the computational network based at least in part on at least one existing weight; and
changing the at least one weight of the processing unit using a local training rule, wherein the local training rule creates sparse connectivity between processing units of the computational network by constraining a norm of a weight vector comprising weights associated with connections between the processing units to a defined value when an average change of the weights equals zero,
wherein the local training rule imposes a constraint on a sum of absolute values of the weights.

47. The computer program product of claim 46, wherein the constrained weights are associated with input connections to the processing unit.

48. A computer program product for training a computational network, comprising a non-transitory computer-readable medium comprising code for:
computing an output of a processing unit in the computational network based at least in part on at least one existing weight; and
changing the at least one weight of the processing unit using a local training rule, wherein the local training rule creates sparse connectivity between processing units of the computational network by constraining a norm of a weight vector comprising weights associated with connections between the processing units to a defined value when an average change of the weights equals zero,
wherein the local training rule constrains an input weight vector associated with input connections to the processing unit at an equilibrium point.

49. A computer program product for training a computational network, comprising a non-transitory computer-readable medium comprising code for:
computing an output of a processing unit in the computational network based at least in part on at least one existing weight; and
changing the at least one weight of the processing unit using a local training rule, wherein the local training rule creates sparse connectivity between processing units of the computational network by constraining a norm of a weight vector comprising weights associated with connections between the processing units to a defined value when an average change of the weights equals zero, wherein the local training rule constrains a number of nonzero weights.

50. The computer program product of claim 49, wherein the constrained weights are associated with input connections to the processing unit.

51. A computer program product for training a computational network, comprising a non-transitory computer-readable medium comprising code for:
- computing an output of a processing unit in the computational network based at least in part on at least one existing weight; and
- changing the at least one weight of the processing unit using a local training rule, wherein the local training rule creates sparse connectivity between processing units of the computational network by constraining a norm of a weight vector comprising weights associated with connections between the processing units to a defined value when an average change of the weights equals zero,
- wherein the processing unit utilizes one or more non-linear operations.

52. A computer program product for training a computational network, comprising a non-transitory computer-readable medium comprising code for:
- computing an output of a processing unit in the computational network based at least in part on at least one existing weight; and
- changing the at least one weight of the processing unit using a local training rule, wherein the local training rule creates sparse connectivity between processing units of the computational network by constraining a norm of a weight vector comprising weights associated with connections between the processing units to a defined value when an average change of the weights equals zero,
- wherein the local training rule imposes bounds on individual weights associated with input connections to the processing unit.

53. The computer program product of claim 52, wherein a minimum value of the individual weights is bounded by a lower bound.

54. The computer program product of claim 52, wherein both maximum and minimum values of the individual weights are bounded.

55. The computer program product of claim 52, wherein the bounds vary for the individual weights.

56. The computer program product of claim 52, wherein a maximum value of the individual weights is bounded by an upper bound.

* * * * *